United States Patent

Aimura et al.

[11] Patent Number: 5,852,093
[45] Date of Patent: Dec. 22, 1998

[54] VULCANIZABLE RUBBER COMPOSITION, SEAL USED IN DYNAMIC STATE, AND SEALING MATERIAL

[75] Inventors: Yoshiaki Aimura; Suguru Ito, both of Kawasaki, Japan

[73] Assignee: Nippon Zeon Co., Ltd., Tokyo, Japan

[21] Appl. No.: 849,150

[22] PCT Filed: Nov. 30, 1995

[86] PCT No.: PCT/JP95/02440

§ 371 Date: May 29, 1997

§ 102(e) Date: May 29, 1997

[87] PCT Pub. No.: WO96/17015

PCT Pub. Date: Jun. 6, 1996

[30] Foreign Application Priority Data

Nov. 30, 1994 [JP] Japan .................................. 6-321617

[51] Int. Cl.⁶ ...................................................... C08K 5/22
[52] U.S. Cl. ........................................... 524/432; 524/433
[58] Field of Search ..................................... 524/432, 433

[56] References Cited

U.S. PATENT DOCUMENTS

| | | | |
|---|---|---|---|
| 4,020,039 | 4/1977 | Dunn | 524/448 |
| 4,278,587 | 7/1981 | Wolff | 524/493 |
| 4,374,223 | 2/1983 | Raamsdonk | 524/245 |
| 4,508,867 | 4/1985 | Sato | 524/436 |
| 4,599,370 | 7/1986 | Grossman | 524/451 |
| 4,765,930 | 8/1988 | Mashimo | 524/451 |
| 5,068,137 | 11/1991 | Ozawa et al. | 524/430 |
| 5,100,947 | 3/1992 | Puydak | 524/451 |
| 5,149,732 | 9/1992 | Igarashi | 524/451 |
| 5,264,290 | 11/1993 | Touchet | 524/87 |
| 5,292,579 | 3/1994 | Kitayama | 428/283 |
| 5,621,044 | 4/1997 | Wang | 524/526 |
| 5,651,995 | 7/1997 | Oyama | 524/565 |
| 5,662,975 | 9/1997 | Hert | 428/36.91 |
| 5,683,819 | 11/1997 | Mori | 428/500 |

FOREIGN PATENT DOCUMENTS

| | | |
|---|---|---|
| 62-230837 | 10/1987 | Japan . |
| 1-112083 | 4/1989 | Japan . |
| 2-133446 | 5/1990 | Japan . |
| 5-140334 | 6/1993 | Japan . |

*Primary Examiner*—Paul R. Michl
*Attorney, Agent, or Firm*—Armstrong, Westerman, Hattori, McLeland & Naughton

[57] ABSTRACT

A vulcanizable rubber composition comprising 100 wt. parts of a highly saturated nitrile copolymer rubber having an iodine value not larger than 80, 3–30 wt. parts of a reinforcing filler, 30–200 wt. parts of an oxide of a metal of group 2 of the periodic table, 30–200 wt. parts of a non-reinforcing filler, and 0.1–20 wt. parts of a vulcanizer. A sealing material comprised of a vulcanizate of the vulcanizable rubber composition and having friction coefficient ($\mu$) not larger than 1.5 and an abrasion wear of 150–350 mg. A seal comprising the sealing material and a reinforcing ring.

22 Claims, 1 Drawing Sheet

VULCANIZABLE RUBBER COMPOSITION, SEAL USED IN DYNAMIC STATE, AND SEALING MATERIAL

TECHNICAL FIELD

This invention relates to a vulcanizable rubber composition comprising a highly saturated nitrile copolymer rubber as the base ingredient; a material for a seal used in a dynamic state which material is composed of a vulcanizate of the rubber composition; and a seal used in a dynamic state.

BACKGROUND ART

In general rubber elastomeric materials, especially an acrylonitrile-butadiene copolymer rubber (NBR) is used as materials for seals which are used in a static or dynamic state as parts of automobiles and aircrafts, and in the field of an energy industry and other industries.

The applicant has proposed in Japanese Unexamined Patent Publication 62-230837 a nitrile group-containing highly saturated copolymer rubber, i.e., hydrogenated NBR, as a sealing material characterized in that, when it is used under high-temperature and high-pressure conditions, neither reduction of sealability nor breakage due to compression occurs. The sealing material made of a nitrile group-containing highly saturated copolymer rubber has greatly enhanced heat resistance and tenacity as compared with a sealing material made of NBR, but, when it is used for a long period, a sealing surface especially a rotational or sliding surface is undesirably carbonized to be thereby blackened and further a multiplicity of fine cracks, i.e., heat cracks occur on the rotational or sliding surface. This undesirable carbonization of the rubber sealing surface is believed to be due to the fact that, when the seal is used for a long period, repeated distortion and friction on the rotational or sliding surface cause heat build-up.

To avoid the undesirable carbonization, the following remedies are considered: (1) enhancement of abrasion resistance of a rubber sealing material by incorporation of a reinforcing filler; (2) reduction of friction coefficient, and (3) suppression of heat build-up. When a salient amount of a reinforcing filler such as, for example, carbon black is incorporated, abrasion wear of the rubber sealing material on the rotational or sliding surface can be reduced. However, the friction coefficient increases with the result of enhancement of heat build-up.

It is known that, when a salient amount of a metal oxide such as zinc oxide is incorporated in a rubber elastomeric material, thermal conductivity is increased and thus heat build-up is suppressed. However, the incorporation of a salient amount of a metal oxide such as zinc oxide inevitably reduces compression set of the elastomeric material and the material does not possess good and balanced characteristics required for a sealing material.

DISCLOSURE OF INVENTION

An object of the present invention is to provide a vulcanizable rubber composition which gives a sealing material having good and balanced characteristics and exhibiting a high thermal conductivity, a suppressed heat build-up and a minimized occurrence of heat cracks.

Another object of the present invention is to provide a sealing material used in a dynamic state, which has the above-mentioned characteristics.

As results of an extensive research, the inventors have found that, when the amount of a reinforcing filler such as carbon black incorporated in a nitrile group-containing highly saturated copolymer rubber is smaller than the amount thereof conventionally employed, and in addition, a relatively large amount of a non-reinforcing filler such as zinc oxide or calcium carbonate is incorporated, a vulcanizable rubber composition having improved thermal conductivity and reduced heat build-up as well as good characteristics required for a sealing material can be obtained. Based on this finding, the present invention has been completed. Further, it has been found that a rubber vulcanizate of the vulcanizable rubber composition is characterized in that the friction coefficient is small and the abrasion wear is within a limited range and does not exceed this range, and thus, the vulcanizate is suitable for a sealing material which is used in a dynamic state at a rotational part or sliding part of a seal.

In one aspect of the present invention, there is provided a vulcanizable rubber composition comprising a highly saturated nitrile copolymer rubber having an iodine value of not larger than 80 and, based on 100 parts by weight of the highly saturated nitrile copolymer rubber, (i) 3 to 30 parts by weight of a reinforcing filler,
(ii) 30 to 200 parts by weight of an oxide of a metal of group 2 of the periodic table,
(iii) 30 to 200 parts by weight of a non-reinforcing filler, and
(iv) 0.1 to 20 parts by weight of a vulcanizer.

In another aspect of the present invention, there is provided a sealing material used in a dynamic state, which is comprised of a vulcanizate of the above-mentioned vulcanizable rubber composition and has a friction coefficient ($\mu$) of not larger than 1.5 and an abrasion wear of 150 to 350 mg.

In still another aspect of the present invention, there is provided a seal used in a dynamic state, which comprises the above-mentioned sealing material and a reinforcing ring.

BEST MODE FOR CARRYING OUT THE INVENTION

Highly Saturated Nitrile Copolymer Rubber

Figure 1:
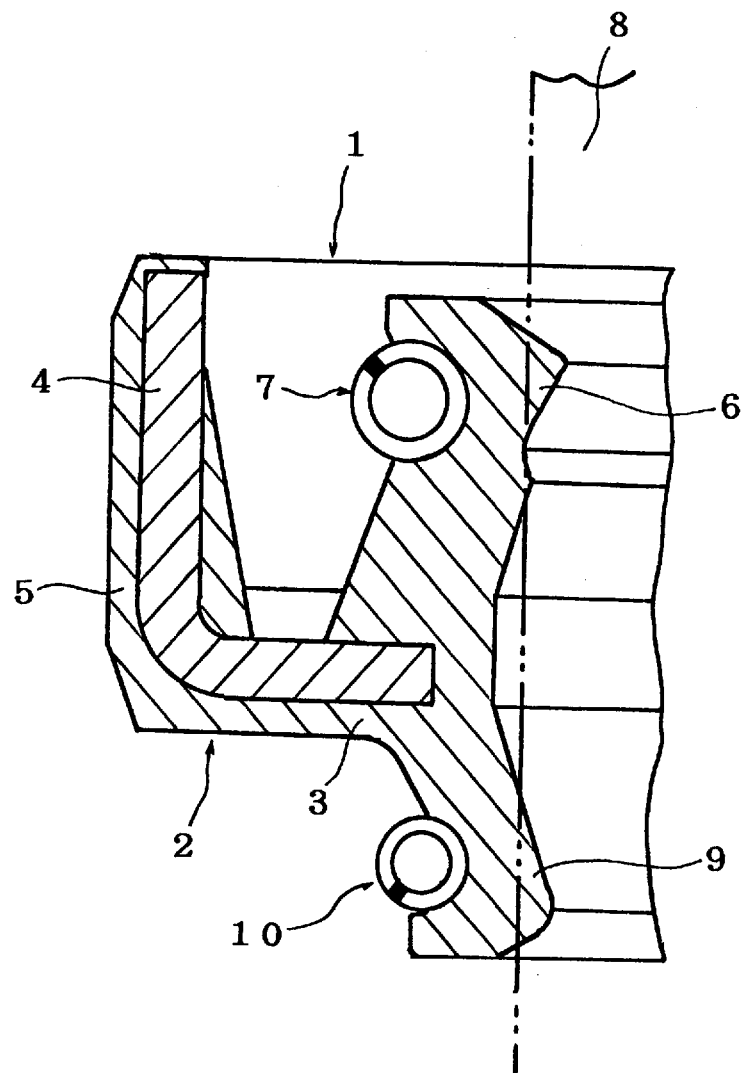
FIG. 1 is a cross-sectional view of an example of a rotational seal.

The highly saturated nitrile copolymer rubber used in the present invention has an iodine value of not larger than 80, preferably not larger than 60. If the iodine value is larger than 80, heat resistance and tenacity of the sealing material are low. There is no critical lower limit of the iodine value, but usually the iodine value is at least 1 because, when a copolymer rubber having a too small iodine value is vulcanized with a sulfur-containing vulcanizer, the vulcanization tends to become difficult.

As examples of the highly saturated nitrile copolymer rubber, there can be mentioned a product obtained by hydrogenating the conjugated diene units of an unsaturated nitrile-conjugated diene copolymer rubber; an unsaturated nitrile-conjugated diene-ethylenically unsaturated monomer terpolymer rubber, and a product obtained by hydrogenating the terpolymer rubber; and an unsaturated nitrile-ethylenically unsaturated monomer copolymer rubber.

As specific examples of the unsaturated nitrile used for the preparation of the highly saturated nitirle copolymer rubber, there can be mentioned acrylonitrile, methacrylonitrile and α-chloroacrylonitrile. As specific examples of the conjugated diene, there can be mentioned 1,3-butadiene, 2,3-dimethylbutadiene, isoprene and 1,3-pentadiene.

If desired, ethylenically unsaturated monomers and other copolymerizable monomers can be used for the preparation of the highly saturated nitrile copolymer rubber. As specific examples of such monomers, there can be mentioned vinyl monomers such as styrene, -methylstyrene and vinylpyridine; non-conjugated diene monomers such as vinylnorbornene, dicyclopentadiene and 1,4-hexadiene; alkyl acrylates and methacrylates having 1 to about 18 carbon atoms in the alkyl group, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate; alkoxyalkyl acrylates having 2 to about 12 carbon atoms in the alkoxyalkyl group, such as methoxymethyl acrylate, methoxyethyl acrylate, ethoxyethyl acrylate, butoxyethyl acrylate, ethoxypropyl acrylate, methoxyethoxyethyl acrylate and ethoxybutoxyethyl acrylate; cyanoalkyl acrylates having 2 to about 12 carbon atoms in the cyanoalkyl acrylate, such as α- and β-cyanoethyl acrylates, α, β- and γ-cyanopropyl acrylates, cyanobutyl acrylate, cyanohexyl acrylate and cyanooctyl acrylate; hydoxyalkyl acrylates such as 2-hydroxyethyl acrylate and hydroxypropyl acrylate; mono- and di-alkyl esters of an unsaturated dicarboxylic acid such as monoethyl maleate, dimethyl maleate, dimethyl fumarate, diethyl fumarate, di-n-butyl fumarate, di-2-ethylhexyl fumarate, dimethyl itaconate, di-n-butyl itaconate and di-2-ethylhexyl itaconate; other esters of an unsaturated carboxylic acid such as dimethylaminomethyl acrylate, diethylaminoethyl acrylate, 3-(diethylamino)-2-hydroxypropyl acrylate and 2,3-bis(difluoroamino)propyl acrylate; fluoroalkyl acrylates and methacrylates such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluobooctyl methacrylate and hexadecafluorononyl methacrylate; fluorine-substituted benzyl acrylates and methacrylates such as fluorobenzyl acrylate, fluorobenzyl methacrylate and difluorobenzyl methacrylate; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- or p-trifluoromethylstyrene, vinyl pentafluorobenzoate, difluoroethylene and tetrafluoroethylene; and polyethylene glycol acrylate, polyethylene glycol methacrylate, polypropylene glycol acrylate, polypropylene glycol methacrylate, epoxy actylate, epoxy methacrylate, urethane acrylate and urethane methacrylate. The amount of these monomers is not particularly limited, but usually not larger than 80% by weight based on the total monomers. For a copolymer rubber used in a field wherein a good oil resistance is required, the amount of the above-mentioned copolymerizable monomers is usually not larger than 10% by weight based on the total monomers.

As specific examples of the highly saturated nitrile copolymer rubber, there can be mentioned hydrogenation products of a butadiene-acrylonitrile copolymer rubber, an isoprene-butadiene-acrylonitrile copolymer rubber and an isoprene-acrylonitrile copolymer rubber; a butadiene-methyl acrylate-acrylonitrile copolymer rubber and a butadiene-acrylic acid-acrylonitrile copolymer rubber and hydrogenation products of these copolymer rubbers; and butadiene ethylene-acrylonitrile copolymer rubber, a butyl acrylate-ethoxyethyl acrylate-vinyl chloroacetate-acrylonitrile copolymer rubber and butyl acrylate-ethoxyethyl acrylate-vinylnorbornene-acrylonitrile copolymer rubber.

Of the above-mentioned highly saturated nitrile copolymer rubbers, a hydrogenation product of an acrylonitrile-butadiene copolymer rubber having a bound acrylonitrile content of 10 to 60% by weight, preferably 20 to 50% by weight is especially suitable. Commercially available acrylonitrile-butadiene copolymers having a wide variety of bound acrylonitrile contents can be used and the most adequate bound acrylonitrile content should be chosen depending upon the particular properties desired.

The highly saturated nitrile copolymer rubber used in the present invention preferably has a Mooney viscosity ($ML_{1+4}$, 100° C.) of 30 to 300. If the Mooney viscosity is lower than 30, when a seal is used under a high pressure for a long period, the durability is unsatisfactory, and the compression set and other compression characteristics also are unsatisfactory. If the Mooney viscosity exceeds 300, the processability by kneading becomes poor. The Mooney viscosity is more preferably in the range of 50 to 200, and most preferably 60 to 150.

The procedures for the preparation of the highly saturated copolymer rubber used in the present invention are not particularly limited, and a conventional polymerization procedure and a conventional hydrogenation procedure can be employed.

As examples of a catalyst used for hydrogenation of an unsaturated nitrile copolymer rubber, there can be mentioned palladium/silica and a palladium complex (Japanese Unexamined Patent Pablication [JP-A] No. 3-252405), and rhodium compounds and ruthenium compounds (JP-A 62-125858, JP-A 62-42937, JP-A 1-45402, JP-A 1-45403, JP-A 1-45404 and JP-A 1-45405).

Preferably the highly saturated nitrile coplymer rubber used in the present invention is substantially free from halogen so that, when a shaped vulcanizate of the copolymer rubber is used as a seal in contact with a metal, a problem of metal corrosion does not arise. The halogen-free copolymer rubber can be prepared by adopting a halogen-free coagulant such as, for example, a metal sulfate when an as-polymerized copolymer latex is coagulated.

Reinforcing Filler

The reinforcing filler incorporated in the vulcanizable rubber composition of the present invention means a filler which is capable of enhancing mechanical strength of a rubber by incorprating the filler with the rubber. As specific examples of the reinforcing filler, there can be mentioned carbon black and silica (including dry process silica, wet process silica and others).

The amount of the reinforcing filler is in the range of 3 to 30 parts by weight, preferably 5 to 20 parts by weight, based on 100 parts by weight of the highly saturated nitrile copolymer rubber. If the amount of the reinforcing filler is too small, mechanical strength and abrasion resistance of the rubber vulcanizate are very poor although the reinforcing effect can be obtained to some extent. In contrast, if the amount of the reinforcing filler is too large, heat build-up cannot be sufficiently controlled and heat cracks tend to occur, and friction coefficient undesirably increases.

Oxide of Metal of Group 2 of Periodic Table

As preferable examples of the oxide of a metal of group 2 of the periodic table, there can be mentioned oxides of a metal of group 2A of the periodic table such as oxides of magnesium including magnesium oxide and surface-treated magnesium oxide, oxides of calcium including calcium oxide and oxides of barium including barium oxide; and oxides of a metal of group 2B of the periodic table such as oxides of zinc which include zinc oxide, activated zinc oxide, surface-treated zinc oxide, composite zinc oxide and composite activated zinc oxide. Most of these metal oxides are generally known as vulcanization accelerator and vulcanization promoter for rubber, and such commercially available metal oxides can be used.

The main point of the present invention lies in that the oxide of a metal of group 2 of the periodic table and a non-reinforcing filler are incorporated in combination and both in relatively large amounts. If the amount of each of the oxide of group 2 metal and a non-reinforcing filler is smaller than 30 parts by weight per 100 parts by weight of the copolymer rubber, a vulcanizate of the copolymer rubber composition has a large compression set and a low thermal conductivity, the heat build-up is difficult to thoroughly control, and, when it is used especially for a rotational seal, heat cracks tend to occur. Even when a relatively large amount of a non-reinforcing filler is incorporated, if the amount of the oxide of group 2 metal is not larger than 30 parts by weight, the compression set is not small to the desired extent and, when the rubber vulcanizate is used as a rotational seal, heat cracks tend to occur. If the amount of the oxide of group 2 metal exceeds 200 parts by weight, abrasion resistance of the sealing material is reduced. Preferably the amount of the oxide of group 2 metal is in the range of 50 to 150 parts by weight per 100 parts by weight of the copolymer rubber.

Non-reinforcing Filler

As mentioned above, the main point of the present invention lies in that a relatively large amount of an oxide of a metal of group 2 of the periodic table and a relatively large amount of a non-reinforcing filler are incorporated in combination in a highly saturated nitrile copolymer rubber. If a reinforcing filler such as carbon black or silica is incorporated in a relatively large amount instead of a non-reinforcing filler, the mechanical strength of rubber vulcanizate is increased, but the heat buildup cannot be suppressed to the desired extent and heat cracks occur.

The non-reinforcing filler does not exhibit a reinforcing effect or exhibits a reinforcing effect only to a minor extent when it is incorporated in rubber. The non-reinforcing filler is generally used for the purpose of enhancement of processability and reduction of production cost. As specific examples of the non-reinforcing filler, there can be mentioned calcium carbonate, clay and talc.

The amount of the non-reinforcing filler is 30 to 200 parts by weight, preferably 50 to 150 parts by weight, based on 100 parts by weight of the copolymer rubber. If the amount of the non-reinforcing filler is too small, the compression set is not low to a satisfactory extent, the heat build-up cannot be controlled to the desired extent and heat cracks tend to occur. In contrast, if the amount of the non-reinforcing filler is too large, the tensile strength is drastically reduced and the abrasion resistance is lowered.

The ratio of the oxide of group 2 metal to the non-reinforcing filler is preferably in the range of 40/60 to 60/40 by weight. If the metal oxide/non-reinforcing filler ratio is outside this range, the compression set is relatively large, the heat build-up cannot be controlled to desired extent and heat cracks tend to occur.

Vulcanizer

In the vulcanizable rubber composition of the present invention, a vulcanizer is contained in an amount of 0.1 to 20 parts by weight, preferably 5 to 15 parts by weight, per 100 parts by weight of the copolymer rubber.

As the vulcanizer, an organic peroxide vulcanizer and a sulfur-containing vulcanizer are used.

As specific examples of the oraganic peroxide vulcanizer, there can be mentioned tert-butyl hydroperoxide, cumene hydroperoxide, di-tert-butyl peroxide, tert-butyl-cumyl peroxide, 2,5-dimethyl-tert-butyl peroxyhexane, 2,5-dimethyl-tert-butyl peroxyhexyne, 1,3-bis(tert-butyl peroxyisopropyl)benzene, p-chlorobenzoyl peroxide, tert-butyl peroxybenzoate, tert-butyl peroxyisopropyl carbonate and tert-butyl benzoate. In combination with these organic peroxide vulcanizers, vulcanizing aids are generally used. The vulcanizing aids include polyfunctional unsaturated compounds such as trimethylolpropane trimethacrylate, divinylbenzene, ethylene dimethacrylate, polyethylene glycol dimethacrylate, triallyl isocyanurate, triallyl cyanurate, diallyl phthalate, diallyl itaconate and triallyl trimellitate.

As specific examples of the sulfur-containing vulcanizer, there can be mentioned sulfur such as powdery sulfur, flower of sulfur, precipitated sulfur, colloidal sulfur, surface-treated sulfur and insoluble sulfur; and sulfur-containing compounds such as sulfur chloride, sulfur dichloride, morpholine disulfide, an alkylphenol disulfide, N,N'-dithio-bis (hexahydro-2H-azepinon-2), phosophorus-containing polysulfide and high molecular weight polysulfide. Further, sulfur-containing vulcanization promoters such as tetramethythiuram disulfide, selenium dimethyldithiocarbonate and 2-(4'-morpholinodithio)benzothiazole are included.

In combination with the sulfur-containing vulcanizer, a vulcanization promoter can be used which includes, for example, guanidine, aldehyde amine, aldehyde-ammonia, thiazole, sulfenamide, thiourea and xanthate promoters. Stearic acid may also be used.

In the vulcanizable rubber composition of the present invention, auxiliaries which are conventionally used in rubber compositions can be incorparated according to the need. Such auxiliaries include, for example, processing aids, processing oils including plasticizers, antioxidants and antiozonants.

If desired, other rubbers can be incorporated in combination with the highly saturated nitrile copolymer rubber in the vulcanizable rubber composition of the present invention, provided that the object of the present invention can be achieved. The rubbers include, for example, an acrylic rubber, a fluororubber, a styrene-butadiene copolymer rubber, an ethylene-propylene-diene terpolymer rubber (EPDM), natural rubber and polyisoprene rubber.

The procedure by which the vulcanizable rubber composition of the present invention is prepared is not particularly limited. Usually the rubbery materials, a vulcanizer and other ingredients are mixed and kneaded by a conventional mixer such as a roll mixer or a Banbury mixer.

The sealing material, which is comprised of a vulcanizate of the above-mentioned vulcanizable rubber composition, generally has a friction coefficient ($\mu$) of not larger than 1.5 and is suitable for a seal used in a dynamic state, such as a rotational seal or a sliding seal. (The determination of friction coefficient ($\mu$) will be hereinafter described.)

In the case where the frictional coefficient ($\mu$) of sealing material is not larger than 1.5, when the sealing material is used at the rotational or sliding part of a seal, the rotational or sliding characteristics are improved and the durability is enhanced. If the friction coefficient ($\mu$) is too large, heat cracks tend to occur and the abrasion resistance is deteriorated.

The sealing material comprised of the above-mentioned vulcanizable rubber composition usually has an abrasion wear of 150 to 300 mg, preferably 200 to 300 mg and more preferably 200 to 250 mg. The abrasion wear does not exceed the upper limit of this range. (The determination of abrasion wear will be hereinafter described.) If the abrasion wear of sealing material is too small, heat cracks tend to occur. In contrast, if the abrasion wear is too large, the sealability is reduced.

When the sealing material having the above-mentioned abrasion wear is used in a dynamic state at the rotational or sliding part of a seal, it exhibits excellent performance. Namely, when the sealing material is used in a dynamic state, the sealing surface does not carbonize and fine cracks do not occur. This sealing material is especially suitable for a rotational seal. If the abrasion wear is too small or too large, the sealing material is not suitable for a rotational seal.

The structure of the seal used in a dynamic state such as a rotational seal or a sliding seal is not particularly limited. A typical example of the structure of a rotational seal is illustrated in FIG. 1. Referring to FIG. 1, a rotational seal 1 comprises an annular seal body 2 having an approximately U-shaped cross-section. The annular seal body 2 is anintegrally molded product of a sealing material 3 comprised of the vulcanizable rubber composition of the present invention, with a reinforcing metal ring 4 having an approximately L-shaped cross-section, embedded in the sealing material 3.

When used, the rotational seal 1 is fitted in the site to be sealed, in a manner such that an outer peripheral part 5 of the annular seal body 2 is fixed on an inner wall of the site to be sealed or in a groove thereof. A lip part 6 consitituting an inner portion of the annular seal body 2 is pressed against on the outer periphery of a rotational axis 8 by a spring 7 mounted on the outer periphery of the lip part 6, so that the lip part 6 is placed in close contact with the rotational axis 8 to prevent leakage of an oil. Another lip part 9 of the annular seal body 2 is placed in close contact with the rotational axis 8 by a spring 10 to prevent penetration of dust from the atmosphere.

The invention will be described more specifically by the following examples. Parts and % in the examples and comparative examples are by weight unless otherwise specified.

Properties of rubber vulcanizates were determined as follows.

(1) Physical Proterties in Ordinary State

According to Japanese Industrial Standard (JIS) K6301, an unvulcanized rubber composition prepared according to the recipe shown in Table 1 was vulcanized first at 170° C. for 20 minutes and then at 150° C. for 4 hours to give a sheet having a thickness of 2 mm. A #3 dumbbell specimen was cut out from the sheet, and tensile strength at break (kgf/cm$^2$) and elongation at break (%) were measured. Hardness was measured by using a JIS spring-type A hardness tester.

(2) Resistance to Heat Aging in Air

Resistance to heat aging in air was evaluated according to JIS K6301 by allowing the same specimen as mentioned above to stand at a temperature of 150° C. for 72 hours and thereafter measuring the tensile strength at break, elongation at break and hardness. The heat aging resistance was expressed by the change (± %) of these properties.

(3) Compression set

Compression set (%) was measured according to JIS K6301 wherein the measurement was conducted after the same specimen as mentioned above was maintained at a temperature of 150° C. in air for 72 hours.

(4) Heat Build-Up

Using the same specimen as mentioned above, heat build-up temperature and thermal conductivity were measured. The measurement of heat build-up temperature was conducted by using a hydraulic fatigue tester (made by Saginomiya Seisakusho) under the following conditions.

Compression ratio: 3%

Displacement: ±0.5 mm

Frequency: 12 Hz

Testing time: 10 minutes

Testing temperature: room temperature

The measurement of thermal conductivity was conducted by using a thermal conductivity tester (Kemthem QTM-03 made by Kyoto Electroindustry Co.).

(5) Friction Coefficient ($\mu$)

Friction coefficient ($\mu$) was measured on the same vulcanized rubber sheet as prepared for the determination of physical properties in ordinary state, by using a surface tester HEIDON-14S/D made by Shintoh Kagaku K.K. under the following conditions:

Load of ball indenter: 100 g

Sliding rate of ball indenter: 500 mm/min

Testing temperature: room temperature (6) Abrasion wear

Abrasion wear (mg) was measured on the same specimen as mentioned above according to JIS K6264 wherein a Tabor abrader with a truck wheel H-18 was used under a load of 1 kg at a revolution number of 1,000.

(7) Compression Fatigue Resistance

Compression fatigue resistance was determined according to ASTM-D623 using a Goodrich flexometer. The specimen was of a columnar shape having a diameter of 17.5 mm and a height of 25 mm, and prepared by the same procedure as used for the preparation of the specimen used in (1) above. Blow-out time (minutes), i.e., the time for which the specimen reached breaking, was measured under the following conditions.

Load: 25 lbs

Displacement: ±4.4 mm

Frequency: 30 Hz

Testing temperature: room temperature

The longer the blow-out time, the lower the internal heat build-up and the more suitable for a seal used in a dynamic state the rubber vulcanizate.

(8) Heat Crack Resistance

Heat crack resistance was determined on a specimen made by a procedure wherein a rubber vulcanizate of a rectangular plate having a length of 50 mm, a width of 30 mm and a thickness of 5 mm was prepared under the same vulcanization conditions as employed for the preparation of the specimen in (1) above, and an arc-shaped notch with a radius of 25 mm was cut out on a side with 50 mm length of the rectangular plate. The arc-shaped edge of the notch was rendered thin enough like a sealing lip. The rectangular plate specimen was stood upright so that the arc-shaped notch with thin edge was upward directed. A metal column with a circular cross-section was placed on the arc-shaped notch so that the metal column was contacted with the thin arc-shaped edge. The metal column was rotated at 50 Hz and room temperature for 6 hours, and the state of heat crack occurrence on the contacted surface of the arc-shaped notch was observed. The state of heat crack occurrence was expressed by the following three ratings.

A: No crack occurred

B: Small number of cracks ocurred
C: Many number of cracks occurred

EXAMPLES 1 to 7

Seven kinds of hydrogenated acrylonitrile-butadiene copolymer rubbers (HNBR) having the following iodine values, bound acrylonitrile contents (% by weight) and Mooney viscosities ($ML_{1+4}$, 100° C.) were prepared.

| HNBR | | Iodine value | Mooney viscosity | Bound acrylonitrile content (% by weight) |
|---|---|---|---|---|
| (1) | Zetpol 1010 | 10 | 85 | 44 |
| (2) | Zetpol 2000 | 4 | 85 | 36 |
| (3) | Zetpol 2010 | 11 | 85 | 36 |
| (4) | Zetpol 2020 | 28 | 78 | 36 |
| (5) | Zetpol 2030L | 56 | 58 | 36 |
| (6) | Zetpol 3110 | 15 | 95 | 25 |
| (7) | Zetpol 4110 | 15 | 90 | 17 |

All of HNBR (1) through (7) were supplied by Nippon Zeon Co.

Each HNBR was kneaded on a roll together with auxiliary ingredients according to the recipe shown in Table 1 to give a vulcanizable rubber composition. The vulcanizable rubber composition was subjected to first vulcanization at 170° C. for 20 minutes and then second vulcanization at 150° C. for 4 hours. The properties of the rubber vulcanizate were evaluated. The results are shown in Table 1.

TABLE 1

| Example No. | 1 | 2 | 3 | 4 | 5 | 6 | 7 |
|---|---|---|---|---|---|---|---|
| Recipe | | | | | | | |
| HNBR (1) | 100 | — | — | — | — | — | — |
| HNBR (2) | — | 100 | — | — | — | — | — |
| HNBR (3) | — | — | 100 | — | — | — | — |
| HNBR (4) | — | — | — | 100 | — | — | — |
| HNBR (5) | — | — | — | — | 100 | — | — |
| HNBR (6) | — | — | — | — | — | 100 | — |
| HNBR (7) | — | — | — | — | — | — | 100 |
| Carplex 1120 *1 | 10 | 10 | 10 | 10 | 10 | 10 | 10 |
| Calcium carbonate | 50 | 50 | 50 | 50 | 50 | 50 | 50 |
| Zinc oxide | 50 | 50 | 50 | 50 | 50 | 50 | 50 |
| Nocrac MBZ *2 | 1.5 | 1.5 | 1.5 | 1.5 | 1.5 | 1.5 | 1.5 |
| Thiokol TP-95 *3 | 5 | 5 | 5 | 5 | 5 | 5 | 5 |
| Silane coupling agent A-172 *4 | 1.5 | 1.5 | 1.5 | 1.5 | 1.5 | 1.5 | 1.5 |
| Diethylene glycol | 1 | 1 | 1 | 1 | 1 | 1 | 1 |
| TAIC *5 | 2 | 2 | 2 | 2 | 2 | 2 | 2 |
| Peroxymon F-40 *6 | 8 | 8 | 8 | 8 | 8 | 8 | 8 |
| Physical properties in ordinary state | | | | | | | |
| Tensile strength ($kgf/cm^2$) | 183 | 161 | 158 | 146 | 140 | 136 | 118 |
| Elongation (%) | 250 | 270 | 250 | 210 | 170 | 240 | 250 |
| Hardness (JIS-A) | 72 | 71 | 71 | 72 | 73 | 66 | 62 |
| Heat Aging in Air | | | | | | | |
| Change of tensile strength (%) | −8 | +4 | −6 | −15 | −36 | +1 | +2 |
| Change of elongation (%) | −22 | 0 | −18 | −48 | −71 | +4 | |
| Change of hardness (point) | +6 | +4 | +6 | +12 | +17 | +4 | +4 |
| Compression set (%) | 14 | 14 | 14 | 13 | 13 | 15 | 15 |
| Heat build-up | | | | | | | |
| Heat build-up temperature | 3.5 | 3.7 | 3.1 | 2.5 | 1.5 | 2.7 | 2.5 |
| Thermal conductivity(w/m · k) | 0.43 | 0.44 | 0.44 | 0.44 | 0.45 | 0.46 | 0.46 |
| Compression fatigue resistance | | | | | | | |
| Blow-out time (min) | >120 | >120 | >120 | >120 | >120 | >120 | >120 |
| Abrasion wear | | | | | | | |
| Abrasion wear (mg) | 213 | 232 | 218 | 208 | 201 | 233 | 240 |
| Friction coefficient | 1.3 | 1.4 | 1.3 | 1.2 | 1.2 | 1.2 | 1.3 |
| (room temperature) | | | | | | | |
| Heat crack resistance | | | | | | | |
| Surface state observed | A | A | A | A | A | A | A |

*1 Silica (wet process silica supplied by Shionogi)
*2 Aging inhibitor, 2-mercaptobenzimidazole zinc salt
*3 Di-(butoxyethoxyethyl)adipate (supplied by Thiocol Co.)
*4 Vinyl-tris(β-methoxyethoxy)silane (supplied by Nippon Uniker Co.)

TABLE 1-continued

| Example No. | 1 | 2 | 3 | 4 | 5 | 6 | 7 |
| --- | --- | --- | --- | --- | --- | --- | --- |

*5 Peroxide vulcanization promoter, triallyl isocyanurate
*6 Di-tert-butylperoxydi-isopropylbenzene (40%, supplied by Nippon Oil & Fat Co.)

Comparative Examples 1 to 3

Using HNBR(1)(Zetpol 2000 supplied by Nippon Zeon Co.), vulcanizable rubber compositions were prepared, according to the recipe shown in Table 2 and vulcanized by the same procedures as employed in Examples 1 through 7. The properties of the rubber vulcanizates were evaluated. The results are shown in Table 2.

TABLE 2

| Comparative Example No. | 1 | 2 | 3 |
| --- | --- | --- | --- |
| Recipe | | | |
| HNBR (2) | 100 | 100 | 100 |
| Stearic acid | 0.5 | — | — |
| FEF carbon | 60 | — | — |
| Carplex 1120 *1 | — | 10 | 10 |
| Calcium carbonate | — | — | 50 |
| Zinc oxide | 5 | 50 | — |
| Nocrac MBZ *2 | 1.5 | 1.5 | 1.5 |
| Thiokol TP-95 *3 | 5 | 5 | 5 |
| Silane coupling agent A-172 *4 | 1.5 | 1.5 | 1.5 |
| Diethylene glycol | — | 1 | 1 |
| TAIC *5 | 2 | 2 | 2 |
| Peroxymon F-40 *6 | 8 | 8 | 8 |
| Physical properties in ordinary state | | | |
| Tensile strength (kgf/cm²) | 285 | 218 | 158 |
| Elongation (%) | 190 | 260 | 210 |
| Hardness (JIS-A) | 76 | 69 | 70 |
| Heat Aging in Air | | | |
| Change of tensile strength (%) | −12 | 7 | −18 |
| Change of elongation (%) | −26 | −9 | −21 |
| Change of hardness (point) | +5 | +4 | +6 |
| Compression set (%) | 23 | 17 | 17 |
| Heat build-up | | | |
| Heat build-up temperature | 4.8 | 3.7 | 6.2 |
| Thermal conductivity (w/m · k) | 0.29 | 0.42 | 0.26 |
| Compression fatigue resistance | | | |
| Blow-out time (min) | 75 | 120 | 25 |
| Abrasion wear | | | |
| Abrasion wear (mg) | 25 | 84 | 120 |
| Friction coefficient (room temperature) | 1.8 | 1.8 | 1.7 |
| Heat crack resistance | | | |
| Surface state observed | C | C | C |

*1 through *6 : the same as in Table 1

As seen from the data in Tables 1 and 2, when both of an oxide of a metal of group 2 of the periodic table and a non-reinforcing filler are not incorporated or these ingredients are incorporated only in a minor amount in hydrogenated NBR (Comparative Example 1), the rubber vulcanizate exhibits a very large compression set, and an increased friction coefficient although the abrasion wear is reduced. Further, the thermal conductivity is low and the heat build-up temperature is high, and therefore, the rubber vulcanizate is not suitable for a sealing material used at a rotational or sliding part.

When the oxide of a group 2 metal is incorporated in a large amount in hydrogenated NBR (Comparative Example 2), the compression set is small, the heat build-up temperature is low and the thermal conductivity is high, as compared with those in Comparative Example 1. But, these properties in Comparative Example 2 are still not satisfactory. When a large amount of a non-reinforcing filler is incorporated in hydrogenated NBR (Comparative Example 3), the compression set is smaller than that in Comparative Example 1, but is still not satisfactory. Neither an increase of thermal conductivity nor a reduction of heat build-up temperature is observed as compared with those in Comparative Example 1.

When large amounts of the oxide of a group 2 metal and a non-reinforcing filler are incorporated in hydrogenated NBR (Examples 1 to 7), the effects of reduction of compression set, reduction of heat build-up temperature, increase of thermal conductivity and reduction of friction coefficient are conspicuous.

Industrial Applicability

A vulcanizate of the vulcanizable rubber composition of the present invention has good ozone resistance, heat resistance and oil resistance, which are inherently possessed by highly saturated nitrile copolymer rubbers. The vulcanizate is characterized as exihibiting good and balanced abrasion resistance, compression set and other properties required for a sealing material, and further exhibiting high thermal conductivity, reduced heat build-up and suppressed heat crack occurrence.

Therefore, the vulcanizable rubber composition of the present invention is suitable for sealing rubber materials, which are used in contact with various oils and gases, especially for rotational sealing rubber materials for which high-pressure fluid sealability and sliding part sealability are required. As specific examples of the sealing rubber materials, there can be mentioned an O-ring used in a bearing of a rotational instrument; various rubber seals such as a packing, a gasket and a valve seal; rubber articles for gas wells such as a packer, a well head seal, a blow-out preventor (BOP), a pipe-protector, a fexible joint and a bladder; sliding seals such as a shock absorber; marine and automobile bearing seals such as a crank shaft seal, a bearing seal, a rotary seal for an accelerator and a seal for a stern pipe; and packings for heat exchangers used in an energy industry such as a geothermal power industry.

We claim:

1. A vulcanizable rubber composition comprising a highly saturated nitrile copolymer rubber having an iodine value of not larger than 80 and, based on 100 parts by weight of the highly saturated nitrile copolymer rubber:
   (i) 3 to 30 parts by weight of a reinforcing filler,
   (ii) 50 to 200 parts by weight of an oxide of a metal of group 2 of the periodic table,
   (iii) 30 to 200 parts by weight of a non-reinforcing filler, and
   (iv) 0.1 to 20 parts by weight of an organic peroxide vulcanizer, wherein the highly saturated nitrile copolymer rubber is a product obtained by hydrogenating a copolymer of an unsaturated nitrile, a conjugated diene and an optional ethylenically unsaturated monomer.

2. A vulcanizable rubber composition according to claim 1, wherein the highly saturated nitrile copolymer rubber is a product obtained by hydrogenating an acrylonitrile-butadiene copolymer rubber having a bound acrylonitrile content of 10 to 60% by weight.

3. A vulcanizable rubber composition according to claim 1, wherein the highly saturated nitrile copolymer rubber has a Mooney viscosity ($ML_{1+4}$, 100° C.) of 30 to 300.

4. A vulcanizable rubber composition according to claim 1, wherein the highly saturated nitrile copolymer rubber has an iodine value of 1 to 60.

5. A vulcanizable rubber composition according to claim 1, wherein the reinforcing filler is at least one filler selected from the group consisting of carbon black and silica.

6. A vulcanizable rubber composition according to claim 1, wherein the amount of the reinforcing filler is 5 to 20 parts by weight based on 100 parts by weight of the highly saturated nitrile copolymer rubber.

7. A vulcanizable rubber composition according to claim 1, wherein the oxide of a metal of group 2 of the periodic table is at least one oxide selected from the group consisting of oxides of zinc, magnesium, calcium and barium.

8. A vulcanizable rubber composition according to claim 1, wherein the oxide of a metal of group 2 of the periodic table is zinc oxide.

9. A vulcanizable rubber composition according to claim 1, wherein the amount of the oxide of a metal of group 2 of the periodic table is 50 to 150 parts by weight based on 100 parts by weight of the highly saturated nitrile copolymer rubber.

10. A vulcanizable rubber composition according to claim 1, wherein the non-reinforcing filler is an inorganic filler.

11. A vulcanizable rubber composition according to claim 1, wherein the non-reinforcing filler is at least one filler selected from the group consisting of calcium carbonate, clay and talc.

12. A vulcanizable rubber composition according to claim 1, wherein the amount of the non-reinforcing filler is 50 to 150 parts by weight based on 100 parts by weight of the highly saturated nitrile copolymer rubber.

13. A vulcanizable rubber composition according to claim 1, wherein the ratio by weight of the oxide of a metal of group 2 of the periodic table to the non-reinforcing filler is 40/60 to 60/40.

14. A vulcanizable rubber composition accroding to claim 1, wherein the vulcanizer is either an organic peroxide vulcanizer which is used in combination with a polyfunctional unsaturated compound.

15. A sealing material used in a dynamic state, which is comprised of a vulcanizate of the vulcanizable rubber composition claimed in claim 1, and has a friction coefficient ($\mu$) of not larger than 1.5 and an abrasion wear of 150 to 350 mg.

16. A sealing material according to claim 15, wherein the abrasion wear is 200 to 300 mg.

17. A sealing material according to claim 15, wherein the abrasion wear is 200 to 250 mg.

18. A sealing material according to claim 15, which is a rotational sealing material.

19. A sealing material according to claim 15, which is a sliding sealing material.

20. A seal used in a dynamic state, which comprises the sealing material claimed in claim 15, and a reinforcing ring.

21. A seal according to claim 20, which is a rotational seal.

22. A seal according to claim 20, which is a sliding seal.

* * * * *